United States Patent
Yu et al.

(10) Patent No.: US 12,349,188 B2
(45) Date of Patent: Jul. 1, 2025

(54) METHOD AND APPARATUS OF VEHICLE-TO-EVERYTHING (V2X) COMMUNICATION

(71) Applicant: LENOVO (BEIJING) LIMITED, Beijing (CN)

(72) Inventors: Xiaodong Yu, Beijing (CN); Zhennian Sun, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 257 days.

(21) Appl. No.: 17/431,090

(22) PCT Filed: Feb. 14, 2019

(86) PCT No.: PCT/CN2019/075096
§ 371 (c)(1),
(2) Date: Aug. 13, 2021

(87) PCT Pub. No.: WO2020/164056
PCT Pub. Date: Aug. 20, 2020

(65) Prior Publication Data
US 2022/0095368 A1  Mar. 24, 2022

(51) Int. Cl.
*H04W 74/04* (2009.01)
*H04L 1/08* (2006.01)
(Continued)

(52) U.S. Cl.
CPC .............. *H04W 74/04* (2013.01); *H04L 1/08* (2013.01); *H04W 72/0446* (2013.01);
(Continued)

(58) Field of Classification Search
CPC ............. H04W 74/04; H04W 72/0446; H04W 74/0825; H04W 74/0866; H04W 92/18; H04L 1/08
See application file for complete search history.

(56) References Cited

U.S. PATENT DOCUMENTS

2014/0044028 A1* 2/2014 Nammi ................ H04L 1/1825
370/336
2019/0245657 A1* 8/2019 Lee ....................... H04W 80/02
(Continued)

FOREIGN PATENT DOCUMENTS

| CN | 109379781 A | 2/2019 |
|---|---|---|
| WO | 2018126797 A1 | 7/2018 |
| WO | 2018148040 A1 | 8/2018 |

OTHER PUBLICATIONS

International Searching Authority, "Written Opinion of the International Searching Authority," PCT/CN2019/075096, May 24, 2019, pp. 1-5.
(Continued)

*Primary Examiner* — Michael Thier
*Assistant Examiner* — Nevena Zecevic Sandhu
(74) *Attorney, Agent, or Firm* — Kunzler Bean & Adamson (57) ABSTRACT

An apparatus and method for handling in-device co-existence of NR V2X and LTE V2X sidelinks are disclosed. The apparatus includes a transceiver that is scheduled to transmit and/or receive a first data transmission over a first radio access technology (RAT) and a second data transmission over a second RAT; and a processor that detects collision between the first data transmission and the second data transmission; wherein, upon detection of collision, the processor further controls the transceiver to selectively drop one of the data transmissions based on a set of selection criteria, the set of selection criteria including: priorities of the first
(Continued)

RAT and the second RAT, and an attribute of the second data transmission indicative of whether it is an initial transmission or a retransmission.

13 Claims, 6 Drawing Sheets

(51) Int. Cl.
  *H04W 72/0446* (2023.01)
  *H04W 74/08* (2024.01)
  *H04W 74/0808* (2024.01)
  *H04W 92/18* (2009.01)
(52) U.S. Cl.
  CPC ... *H04W 74/0825* (2013.01); *H04W 74/0866* (2013.01); *H04W 92/18* (2013.01)

(56) References Cited

U.S. PATENT DOCUMENTS

| | | | | |
|---|---|---|---|---|
| 2019/0342888 | A1* | 11/2019 | Hosseini | H04W 72/20 |
| 2019/0386784 | A1* | 12/2019 | Tang | H04L 1/1822 |
| 2020/0187226 | A1* | 6/2020 | Choi | H04W 72/0453 |
| 2021/0194635 | A1* | 6/2021 | Cedronius | H04L 43/0852 |
| 2021/0329657 | A1* | 10/2021 | Tang | H04W 72/0453 |
| 2021/0345384 | A1* | 11/2021 | Zhang | H04W 72/23 |

OTHER PUBLICATIONS

Huawei, Hisilicon, Remaining issues on EN-DC, NE-DC, and SUL, 3GPP TSG RAN WG1 Meeting #94, R1-1808930, Aug. 20-24, 2018, pp. 1-7, Gothenburg, Sweden.

* cited by examiner

METHOD AND APPARATUS OF VEHICLE-TO-EVERYTHING (V2X) COMMUNICATION

FIELD

The subject matter disclosed herein relates generally to wireless communication, and more particularly relates to an apparatus and method for handling in-device coexistence of New Radio (NR) V2X and Long Term Evolution (LTE) V2X sidelinks.

BACKGROUND

The following abbreviations and acronyms are herewith defined, at least some of which are referred to within the following description.

Third Generation Partnership Project ("3GPP"), New Radio ("NR"), Evolved Node B ("eNB"), 5G Node B ("gNB"), Downlink ("DL"), Uplink ("UL"), Sidelink ("SL"), Long Term Evolution ("LTE"), LTE Advanced ("LTE-A"), Radio Access Network ("RAN"), Radio Access Technology ("RAT"), Evolved UMTS Terrestrial Radio Access Network ("E-UTRAN"), Acknowledgement ("ACK"), Negative Acknowledgement ("NACK"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Machine Type Communication ("MTC"), enhanced MTC ("eMTC"), Narrow Band Internet of Things ("NBIoT"), Internet of Things ("IoT"), Physical Downlink Control Channel ("PDCCH"), MTC Physical Downlink Control Channel ("MPDCCH"), Narrowband Physical Downlink Control Channel ("NPDCCH"), Physical Downlink Shared Channel ("PDSCH"), Time Division Duplex ("TDD"), Frequency-Division Multiplexing ("FDM"), Time-Division Multiplexing ("TDM"), Code-Division Multiplexing ("CDM"), User Entity/Equipment (remote device) ("UE"), Network Equipment ("NE"), Discontinuous Reception ("DRX"), Low Power Wide Area ("LPWA"), Paging Occasion ("PO"), System Information Block ("SIB"), Bandwidth Reduced Low Complexity/Coverage Enhancement ("BL/CE"), Identification ("ID"), Non-Access Stratum ("NAS"), Preconfigured Uplink Resource ("PUR"), Common Search Space ("CSS"), UE-specific Search Space ("USS"), Single-Carrier Frequency-Division Multiple Access ("SC-FDMA"), Transport Block Size ("TBS"), Modulation Coding Scheme ("MCS"), Downlink Control Indicator ("DCI"), Random Access Channel ("RACH"), Physical Random Access Channel ("PRACH"), Medium Access Control ("MAC"), Downlink Shared Channel ("DL-SCH"), Uplink Shared Channel ("UL-SCH"), Random Access Response ("RAR"), Radio Network Temporary Identifier ("RNTI"), Random Access Radio Network Temporary Identifier ("RA-RNTI"), Buffer Status Report ("BSR"), Integrated Access and Backhaul ("IAB"), millimeter Wave ("mmWave"), Mobile Termination ("MT"), Distributed Unit ("DU"), Central Unit ("CU"), Radio Resource Control ("RRC"), Service Data Adaptation Protocol ("SDAP") and Packet Data Convergence Protocol ("PDCP"), Radio Link Control ("RLC"), Physical Layer ("PHY"), Next Generation Radio Access Network ("NG-RAN"), Scheduling Request ("SR"), End-to-End ("E2E"), MAC Control Element ("MAC CE"), Logical Channel ("LCH"), Logical Channel ID ("LCID"), Protocol Data Unit ("PDU"), Logical Channel Group ("LCG"), Physical Uplink Shared Channel ("PUSCH"), Semi-Persistent Scheduling ("SPS"), Configured Grant ("CG"), Quality of Service ("QoS"), Resource Elements ("RE"), Bandwidth Part ("BWP"), System Frame Number ("SFN"), Subcarrier Spacing ("SCS"), Vehicle-to-Everything ("V2X"), cellular V2X ("C-V2X"), Wireless Local Area Networking ("WLAN"), Radio Access Technology ("RAT"), Device to Device ("D2D"), Proximity Service ("ProSe"), Intelligent Transportation Systems ("ITS"), Transmit ("TX"), Receive ("RX").

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations, and a base station may perform wireless communication with UEs.

Vehicle-to-everything (V2X) communication is the passing of information from a vehicle to any entity that may affect the vehicle, and vice versa. It is a vehicular communication system that incorporates other more specific types of communication as V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). V2X is the key technology of the future intelligent transportation system, and its application will enhance road safety and traffic efficiency, reducing congestion and energy consumption. There are two types of V2X communication technology depending on the underlying technology being used: WLAN-based and cellular-based.

V2X communication using wireless mobile networks is called cellular V2X (or C-V2X) to differentiate it from the WLAN-based V2X. 3GPP published V2X specifications based on LTE as the underlying technology in 2016 and has continued to expand the V2X functionalities to support fifth generation (5G) access networks, which can also be referred to as New Radio (NR) access networks. To indicate the underlying radio access technologies (RATs), the terms NR V2X and LTE V2X may be used for NR-based V2X and LTE-based V2X.

The main advantage of C-V2X includes support of both direct communication between vehicles (V2V) and wireless communication. However, when two radio-access technologies within the same UE operate in adjacent frequency channels they may create mutual problems for each other, such as reduced transmission power and/or interference.

SUMMARY

An apparatus and method for handling in-device coexistence of NR V2X and LTE V2X sidelinks are disclosed.

According to a first aspect, there is provided an apparatus comprising a transceiver that is scheduled to transmit and/or receive a first data transmission over a first radio access technology (RAT) and a second data transmission over a second RAT; and a processor that detects collision between the first data transmission and the second data transmission; wherein, upon detection of collision, the processor further controls the transceiver to selectively drop one of the data transmissions based on a set of selection criteria, the set of selection criteria comprising: priorities of the first RAT and the second RAT, and an attribute of the second data transmission indicative of whether it is an initial transmission or a retransmission.

The first RAT may be New Radio (NR), and the second RAT may be Long-Term Evolution (LTE).

Collision between the first data transmission and the second data transmission may occur where the first and the second data transmissions overlap in a time domain.

In some embodiments, a set of selection criteria further comprises comparison of a first priority level of the first data transmission and a second priority level of the second data transmission.

In some embodiments, a set of selection criteria further comprises comparison of a first priority level of the first data transmission and a priority level threshold.

In some embodiments, the first data transmission may be dropped upon determining that the second data transmission is an initial transmission. The second data transmission may be dropped upon determining that the second data transmission is a retransmission.

Upon determining that the second data transmission is a retransmission, the processor may further compare a first priority level of the first data transmission and a second priority level of the second data transmission, and selectively drop one of the data transmissions with a lower priority level.

Optionally or alternatively, upon determining that the second data transmission is a retransmission, the processor may further compare a first priority level of the first data transmission and a priority level threshold, and selectively drop one of the data transmissions based on a result of the comparison.

The priority level threshold may be pre-configured and/or configured by a base station.

In some embodiments, a first data transmission over the first RAT is transmitted by the transceiver; a second data transmission over the second RAT is a retransmission received by the transceiver; the processor further detects whether a corresponding initial transmission over the second RAT is successfully received by the transceiver; and the first data transmission is dropped upon detection of unsuccessful reception of the initial transmission, and a retransmission of the second data transmission is not received upon detection of successful reception of the initial transmission.

In some other embodiments, the first data transmission over the first RAT is received by the transceiver; the second data transmission over the second RAT is a retransmission by the transceiver; the processor further detects whether a corresponding initial transmission by the transceiver over the second RAT is successfully transmitted; and the first data transmission is not received upon unsuccessful initial transmission, and the second data transmission is dropped upon successful initial transmission.

The processor may further schedule a third data transmission over the first RAT excluding overlapping resources for initial transmissions over the second RAT.

Optionally, the processor further schedules a third data transmission over the first RAT excluding overlapping resources for retransmissions over the second RAT.

The scheduling of the third data transmission may be based on comparison of its priority level and a second priority level of the second data transmission.

According to a second aspect, there is provided a method comprising scheduling a transmission and/or reception, by a transceiver, of a first data transmission over a first radio access technology (RAT) and a second data transmission over a second RAT; detecting, by a processor, collision between the first data transmission and the second data transmission; and controlling the transceiver, by the processor, upon detection of collision, to selectively drop one of the data transmissions based on a set of selection criteria, the set of selection criteria comprising: priorities of the first RAT and the second RAT, and an attribute of the second data transmission indicative of whether it is an initial transmission or a retransmission.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

Figure 1:
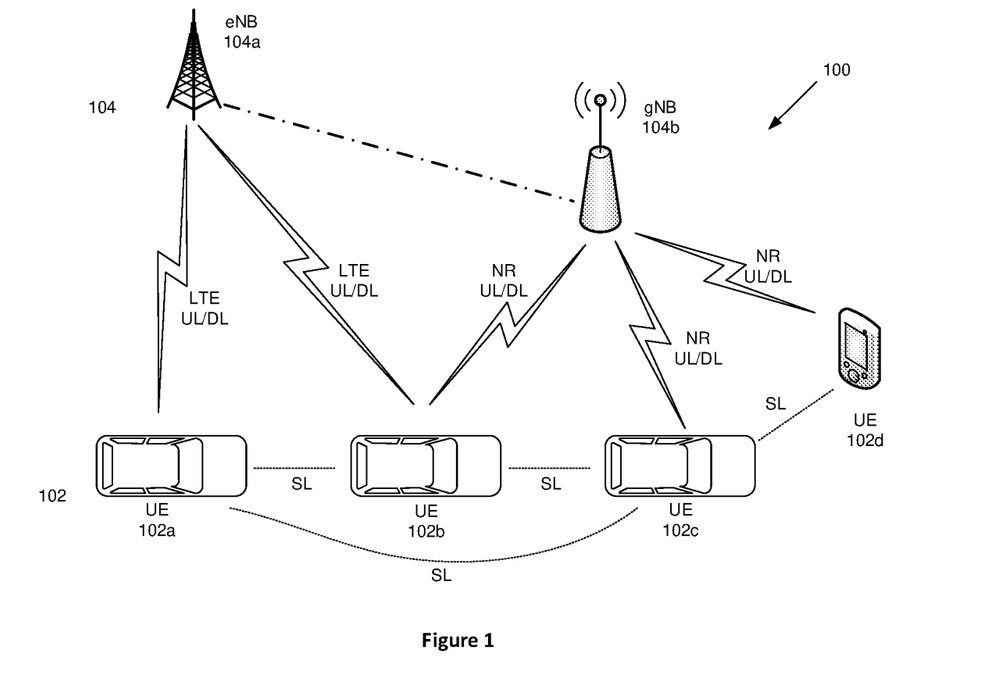
FIG. 1 is a schematic diagram illustrating a wireless communication system.

FIG. 1 is a schematic diagram illustrating a wireless communication system. It depicts an embodiment of a wireless communication system 100 with LTE V2X and NR V2X sidelink coexistence. In one embodiment, the wireless communication system 100 may include user equipment (UEs) 102 and network equipment (NEs) 104. Even though a specific number of UEs 102 and NEs 104 is depicted in FIG. 1, one skilled in the art will recognize that any number of UEs 102 and NEs 104 may be included in the wireless communication system 100.

The user equipment (UEs) 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

In a V2X network, the UEs may be a vehicle or vehicle carried device 102a, 102b, 102c, or a pedestrian carried device 102d.

Network equipment (NEs) 104 may also be referred to as a base station, an access point, an access terminal, a base, a Node-B, an eNB, a gNB, a Home Node-B, a relay node, an apparatus, a device, or by any other terminology used in the art. Throughout this specification, a reference to base station may refer to any one of the above referenced types of the network equipment 104, such as eNB and gNB.

The network equipment 104 may be distributed over a geographic region. The network equipment 104 is generally part of a radio access network that includes one or more controllers communicably coupled to one or more corresponding network equipment 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with 3GPP 5G new radio (NR). In some implementations, the wireless communication system 100 is compliant with the 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The network equipment 104 may serve a number of UEs 102 within a serving area, for example, a cell (or a cell sector) or more cells via a wireless communication link. The network equipment 104 transmits DL communication signals to serve the UEs 102 in the time, frequency, and/or spatial domain.

Communication links are provided between the NEs 104 and the UEs 102, which may be LTE UL/DL communication links between an eNB 104a and UE 102a, 102b for example, or NR UL/DL communication links between a gNB 104b and UE 102b, 102c, 102d for example. Some UEs, in this case UE 102b, may simultaneously communicate with different Radio Access Technologies (RATs), such as NR and LTE.

Direct or indirect communication link between one NE 104a and another NE 104b may also be provided.

Sidelink (SL) is a special kind of communication mechanism between UEs, or device to device (D2D), without going through a base station 104. In this case, the communication with a base station is not required, and proximity service (ProSe) is the feature that specifies the architecture of the direct communication between UEs. As part of ProSe service, a new D2D interface (designated as PC5, also known as sidelink at the physical layer) was introduced. Sidelink may refer to the direct communication between vehicle and other devices (e.g. V2V, V2I), and it uses PC5 interface. PC5 refers to a reference point where user equipment (UE), i.e., a mobile terminal, directly communicates with another UE over the direct channel.

Figure 2:
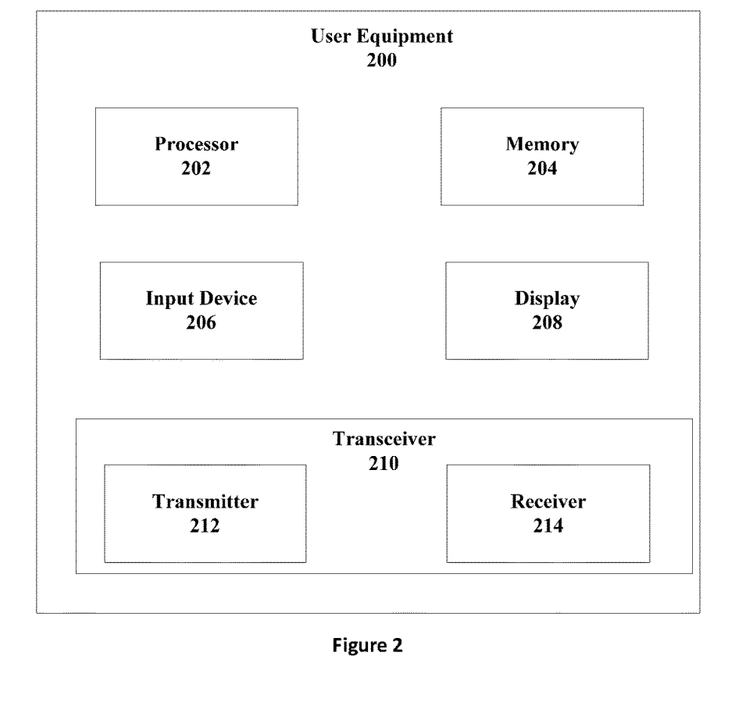
FIG. 2 is a schematic block diagram illustrating components of user equipment (UE) according to one embodiment.

FIG. 2 is a schematic block diagram illustrating components of user equipment (UE) according to one embodiment. The UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and display 208 may form a touchscreen or similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment. For example, the transmitter 212 may transmit a HARQ-ACK including feedbacks for one or more DL transmissions. As another example, the receiver 214 may receive various configurations/data from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, UE 200 includes a plurality of transmitter 212 and receiver 214 pairs for communicating on a plurality of wireless networks and/or radio frequency bands, each transmitter 212 and receiver 214 pair configured to communicate on a different wireless network and/or radio frequency band from other transmitter 212 and receiver 214 pairs.

Figure 3:
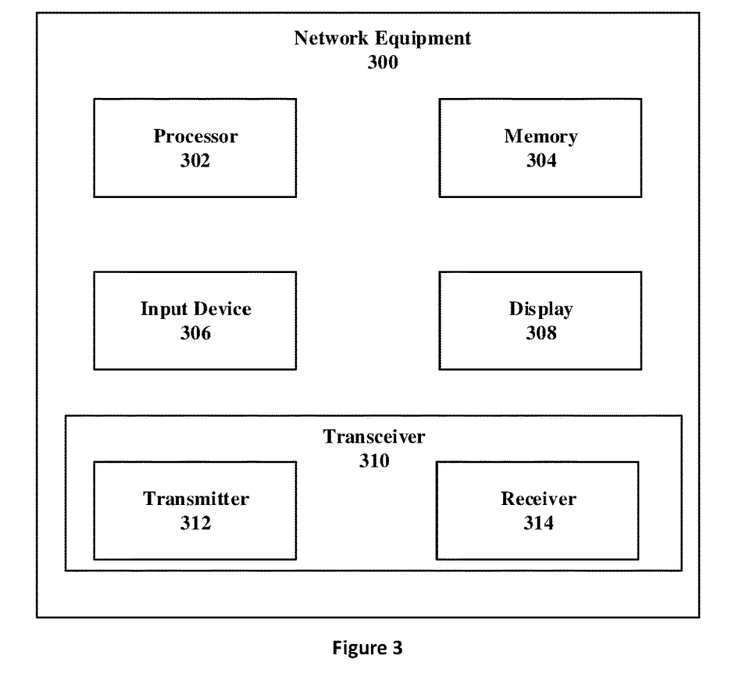
FIG. 3 is a schematic block diagram illustrating components of network equipment (NE) according to one embodiment.

FIG. 3 is a schematic block diagram illustrating components of network equipment (NE) according to one embodiment. The network equipment (NE) 300 may be an exemplary implementation of NE 104 of FIG. 1.

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals/data to UE 200. The processor 302 may also control the transceiver 310 to receive UL signals/data from UE 200. For example, the processor 302 may control the transceiver 310 to receive a HARQ-ACK including feedbacks for one or more DL transmissions. In another example, the processor 302 may control the transceiver 310 to transmit DL signals for various configurations to UE 200, as described above.

The transceiver 310, in one embodiment, is configured to communicate wirelessly with UE 200. In certain embodiments, the transceiver 310 comprises a transmitter 312 and a receiver 314. The transmitter 312 is used to transmit DL communication signals to UE 200 and the receiver 314 is used to receive UL communication signals from UE 200. For example, the receiver 314 may receive a HARQ-ACK codebook from UE 200. As another example, the transmitter 312 may transmit the various configurations/data of NE 300.

The transceiver 310 may communicate simultaneously with a plurality of UEs 200. For example, the transmitter 312 may transmit DL communication signals to UE 200. As another example, the receiver 314 may simultaneously receive UL communication signals from UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, NE 300 may serve multiple cells and/or cell sectors, wherein the transceiver 310 includes a transmitter 312 and a receiver 314 for each cell or cell sector.

If two radio access technologies within the same UE operate in adjacent frequency channels they may create mutual problems for each other: both from reception and transmission perspectives. For example, a UE transmitting data simultaneously in LTE and NR in adjacent frequency channels may result in reduced transmission power for both transmissions and may cause interference with one another. This may be a typical problem for LTE PC5 and NR PC5 interfaces that deliver V2X services since intra-band frequency operation is foreseen in ITS spectrum at least in near term future. The in-device coexistence issues may cause degradation of V2X or enhanced V2X (eV2X) services.

In the context of in-device coexistence between NR and LTE V2X sidelinks, TDM solutions are those that prevent overlapping or simultaneous NR and LTE V2X sidelink transmissions. In some embodiments, the NR V2X sidelink and LTE V2X sdielink may be co-channel or in adjacent channels. For short time scale TDM solutions, the priority in terms of RAT or service can be used as a criterion to handle the conflict between LTE SL and NR SL. In other words, when the conflict happens, the UE behavior can be determined according to the priority of the corresponding service/RAT. If the SL TX of high priority service/RAT happens to be overlapped with the SL RX of low priority service/RAT, then SL RX omission can be considered for the low priority service/RAT. A criterion to handle conflict between LTE SL and NR SL is provided.

NR V2X is destined as 3GPP V2X phase 3 and would support advanced V2X services beyond the basic road safety services supported in LTE V2X. The advanced V2X services would require enhanced NR system and new NR sidelink to meet the stringent requirements. NR V2X system is expected to have a flexible design in support of services with low latency and high reliability requirements. NR system also expects to have higher system capacity and better coverage. The flexibility of NR sidelink framework would allow easy extension of NR system to support the future development of further advanced V2X services and other services.

A RAT selection rule with consideration of the priority of each RAT (e.g. NR and LTE) and the occurrence of initial/retransmission of LTE RAT for in-device coexistence is provided. The RAT selection rule provides a short time scale TDM solutions for in-device coexistence for V2X, assuming SPS scheduling (mode-3 or mode-4) for LTE V2X.

Figure 4A:
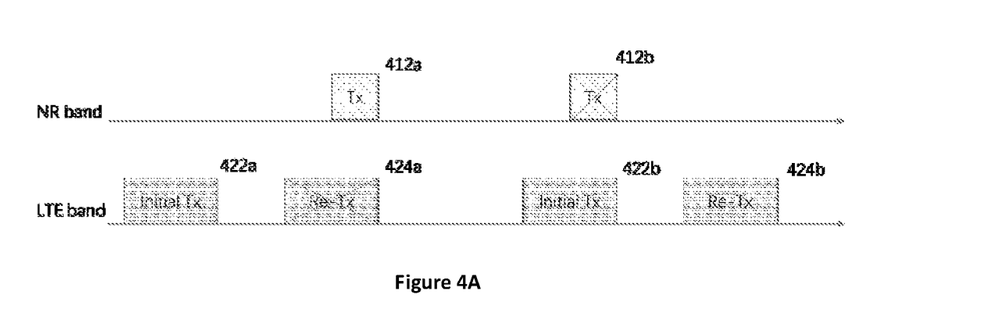
FIG. 4A is a schematic diagram illustrating an embodiment of NR V2X and LTE V2X sidelink coexistence with NR TX and LTE TX collision.
Figure 4B:
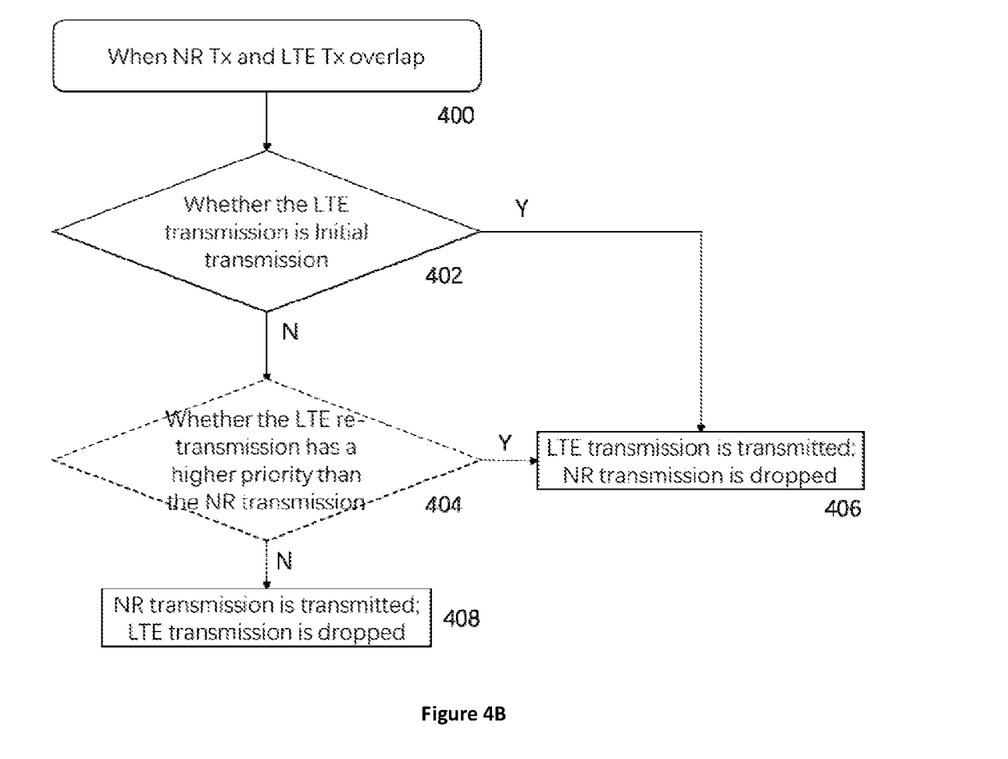
FIG. 4B is a flow diagram illustrating a mechanism for resolving the collision between NR TX and LTE TX of FIG. 4A.

FIG. 4A is a schematic diagram illustrating an embodiment of NR V2X and LTE V2X sidelink coexistence with NR TX and LTE TX collision. FIG. 4B is a flow diagram illustrating a mechanism for resolving the collision between NR TX and LTE TX of FIG. 4A.

In one embodiment, apparatus 200 is provided that is comprised of a transceiver 210 that is scheduled to transmit and/or receive a first data transmission over a first radio access technology (RAT) and a second data transmission over a second RAT; and a processor 202 that detects collision between the first data transmission and the second data transmission; wherein, upon detection of collision, the processor further controls the transceiver to selectively drop one of the data transmissions based on a set of selection criteria. The set of selection criteria comprising: priorities of the first RAT and the second RAT, and an attribute of the second data transmission indicative of whether it is an initial transmission or a retransmission. In some embodiments, dropping of a data transmission may refer to not-transmitting (for TX) a scheduled transmission of data. In some other embodiments, dropping of a data transmission may refer to not-receiving (for RX) a scheduled transmission of data. In this case, the corresponding radio resource initially scheduled for receiving the transmission may be used for transmitting another data transmission.

The first RAT may be New Radio (NR), and the second RAT may be Long-Term Evolution (LTE). Collision between the first data transmission and the second data transmission occurs where the first and the second data transmissions overlap in a time domain. Overlapping of data transmissions may include both full overlap and partial overlap. Full overlap refers to a situation that both start time and end time the two data transmissions are the same, or the transmission duration of one data transmission is completely within the transmission duration of the other. Partial overlap refers to a situation that the two data transmissions start at different time and/or end at different time and may have different time durations. The two data transmissions may partially overlap when they have a shared time period while both transmissions are active.

As shown in FIG. 4B, when NR TX and LTE TX overlap in step 400, UE first determines whether the LTE transmission is an initial transmission or not, as shown in step 402:
    if the LTE transmission 422b is an initial transmission of a transmission block, the LTE transmission is transmitted meanwhile the NR transmission 412b is dropped as shown in step 406;
    otherwise, if the LTE transmission 424a is retransmission of a transmission block, the NR transmission 412a is transmitted meanwhile the LTE retransmission 424a is dropped as shown in step 408.

In this case, as illustrated in FIG. 4A, it is assumed that the second RAT, i.e., the LTE, has a higher priority than the first RAT, i.e., the NR. In one example, the LTE V2X is focused on basic functionalities such as road safety and efficiency while NR V2X provides enhanced functionalities.

As shown in FIG. 4A, the first data transmission 412b (i.e., NR TX) may be dropped, once collision has been detected, upon determining that the second data transmission 422b is an initial transmission. Furthermore, the second data transmission 424a (i.e., LTE Re-TX) may be dropped, once collision has been detected, upon determining that the second data transmission 424a is a retransmission.

Referring to FIG. 4B, the above mechanism may optionally further include a priority level comparison 404. In some embodiments, a set of selection criteria further comprises comparison 404 of a first priority level of the first data transmission (i.e., NR transmission) and a second priority level of the second data transmission (i.e., LTE retransmission).

A priority level may also be referred to as a priority, or priority value, which may be a numerical value indicating a relative priority among different data transmissions. For TX data transmissions, the priority level may be assigned by the UE and thus is already available. For RX data transmissions, the UE may obtain a priority level from the previous transmissions.

With comparison of the priority level of LTE retransmission and NR transmission as shown in step 404 of FIG. 4B:
    if the priority level of LTE retransmission is higher than the priority level of NR transmission, LTE retransmission is transmitted meanwhile NR transmission is dropped as shown in step 406;
    else if the priority level of LTE retransmission is lower than the priority level of NR transmission, NR transmission is transmitted meanwhile LTE retransmission is dropped as shown in step 408.

Upon determining that the second data transmission is a retransmission (i.e., LTE Re-TX), the processor may further compare a first priority level of the first data transmission (i.e., NR TX) and a second priority level of the second data transmission (i.e., LTE Re-TX), and selectively drop one of the data transmissions with a lower priority level.

Optionally or alternatively, the above mechanism may further include a priority level threshold. In some embodiments, the set of selection criteria further comprises comparison of a first priority level of the first data transmission and a priority level threshold.

The priority level threshold may be pre-configured or configured by a base station. The base station pre-configures or configures a priority level threshold, and
    if the priority level of NR transmission is higher than the configured/pre-configured priority level threshold, NR transmission is transmitted meanwhile LTE retransmission is dropped;
    else if the priority level of NR transmission is lower than the configured/pre-configured priority level threshold, LTE retransmission is transmitted meanwhile NR transmission is dropped.

Upon determining that the second data transmission is a retransmission (i.e., LTE Re-TX), the processor may further compare a first priority level of the first data transmission (NR TX) and a priority level threshold, and selectively drop one of the data transmissions based on a result of the comparison.

Figure 5A:
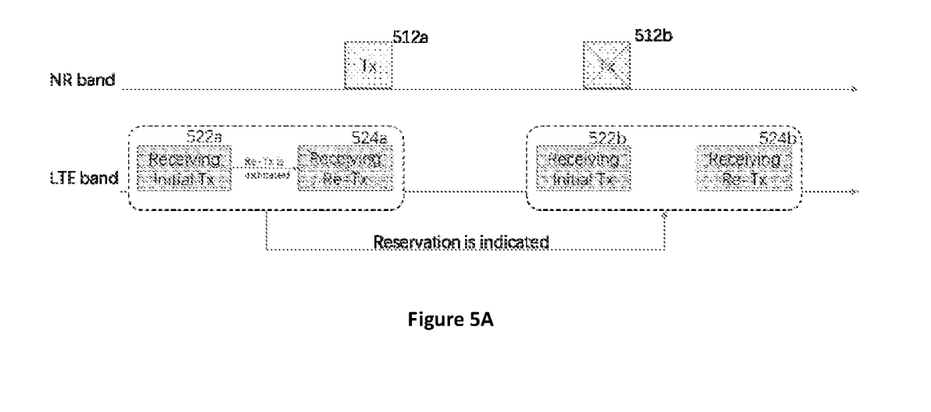
FIG. 5A is a schematic diagram illustrating an embodiment of NR V2X and LTE V2X sidelink coexistence with NR TX and LTE RX collision.
Figure 5B:
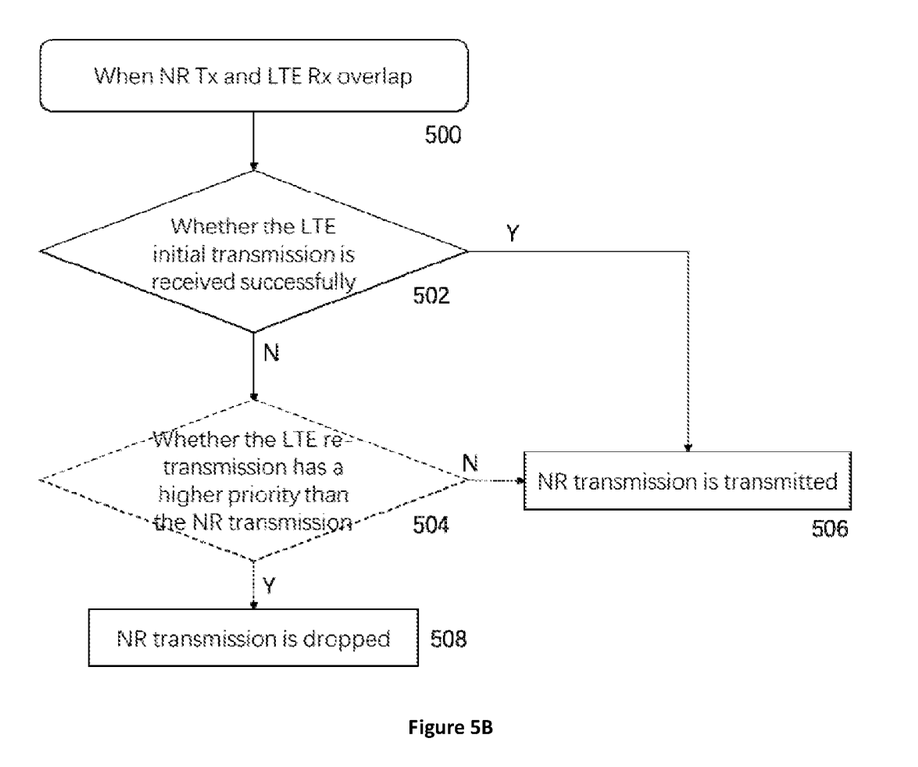
FIG. 5B is a flow diagram illustrating a mechanism for resolving the collision between NR TX and LTE RX of FIG. 5A.

FIG. 5A is a schematic diagram illustrating an embodiment of NR V2X and LTE V2X sidelink coexistence with NR TX and LTE RX collision. FIG. 5B is a flow diagram illustrating a mechanism for resolving the collision between NR TX and LTE RX of FIG. 5A.

As shown in FIG. 5B, when NR TX and LTE RX overlap in step 500, UE determines whether to transmit a NR transmission or not, by determining whether the LTE initial transmission of the LTE transmission block is received successfully or not, as shown in step 502:
    if the initial transmission 522a of the LTE transmission block is received successfully, and NR transmission 512a is overlapped with retransmission 524a of the same LTE transmission block, NR transmission 522a is transmitted (i.e., the LTE Re-TX 524a will be dropped, or in other words, not received and/or decoded). In this case, the LTE Re-TX may also be referred to as LTE RX from the perspective of the UE. When the LTE RX is dropped, or not to be received, the corresponding radio resource may be used for the NR TX transmission, as shown in step 506.

else if the initial transmission 522*a* of one LTE transmission block is received unsuccessfully and NR transmission 512*a* is overlapped with retransmission 524*a* of the same LTE transmission block, NR transmission 512*a* is dropped (i.e., to receive LTE Re-TX), as shown in step 508.

Here, it is also assumed that the second RAT, i.e., the LTE (through which data is received (RX) by the UE), has a higher priority than the first RAT, i.e., the NR (through which data is transmitted (TX) by the UE).

In some embodiments, the first data transmission (i.e., NR TX) over the first RAT is transmitted by the UE's transceiver; the second data transmission (i.e., LTE Re-RX) over the second RAT is a retransmission received by the UE's transceiver; the UE's processor further detects whether a corresponding initial transmission over the second RAT was successfully received at step 502 in FIG. 5B by the transceiver; and the first data transmission is dropped upon detection of unsuccessful reception of the initial transmission, or a retransmission of the second data transmission is not received upon successful reception of the initial transmission.

Optionally, the above mechanism may further include a priority level comparison step 504 as shown in FIG. 5B. With comparison of the priority level of LTE retransmission and NR transmission, when the initial transmission of one LTE transmission block is received unsuccessfully:
    if the priority level of LTE retransmission is higher than the priority level of NR transmission, NR transmission is dropped (i.e., to receive LTE Re-TX) as shown in step 508;
    else if the priority level of LTE retransmission is lower than the priority level of NR transmission, NR transmission is transmitted as shown in step 506.

Optionally or alternatively, the above mechanism may further include a priority level threshold. The priority level threshold can be pre-configured or configured by a base station. The base station pre-configures or configures a priority level threshold, and
    if the priority level of NR transmission is higher than the configured/pre-configured priority level threshold, NR transmission is transmitted (case 1, the initial transmission 522*a*, 522*b* of one LTE transmission block is received unsuccessfully, and NR transmission 512*a*, is transmitted on retransmission resource of LTE; case 2, NR transmission 512*a*, 512*b* is transmitted on a reserved initial transmission and/or retransmission resource of LTE, e.g. 522*a*, 522*b*, 524*a* and 524*b* of FIG. 5A);
    else if the priority level of NR transmission is lower than the configured/pre-configured priority level threshold, NR transmission 512*a*, 512*b* is dropped (i.e., to receive LTE Re-TX 524*a* if initial transmission is received unsuccessfully, and/or to receive LTE initial transmission 522*b*).

Figure 6A:
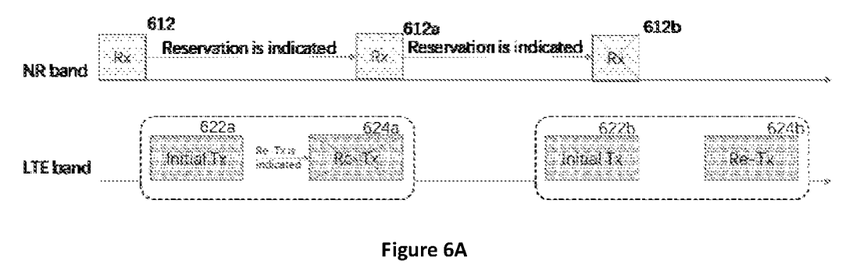
FIG. 6A is a schematic diagram illustrating an embodiment of NR V2X and LTE V2X sidelink coexistence with NR RX and LTE TX collision.
Figure 6B:
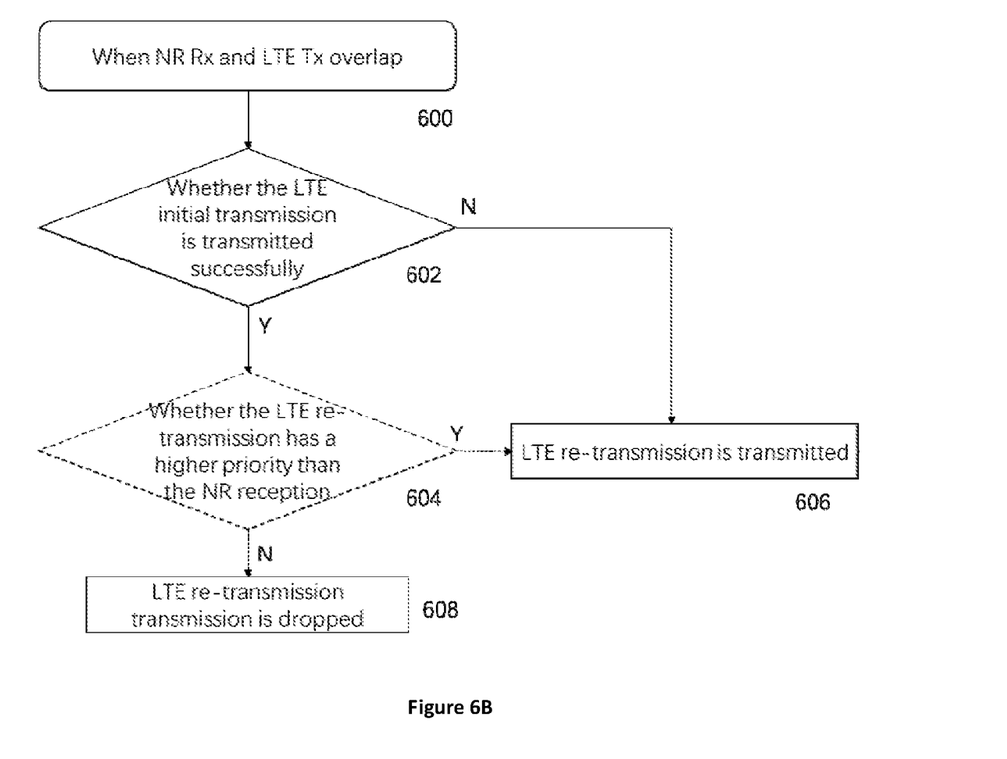
FIG. 6B is a flow diagram illustrating a mechanism for resolving the collision between NR RX and LTE TX of FIG. 6A.

FIG. 6A is a schematic diagram illustrating an embodiment of NR V2X and LTE V2X sidelink coexistence with NR RX and LTE TX collision. FIG. 6B is a flow diagram illustrating a mechanism for resolving the collision between NR RX and LTE TX of FIG. 6A.

As shown in FIG. 6B, when NR RX and LTE TX overlap in step 600, UE determines whether to transmit an LTE transmission or not, by determining whether the initial transmission of the LTE transmission block is transmitted successfully or not, as shown in step 602:
    if the initial transmission 622*a* of one LTE transmission block is transmitted successfully, and NR reception 612*a* is overlapped with retransmission 624*a* of the same LTE transmission block, LTE retransmission 624*a* is dropped, as shown in step 606;
    else if NR reception 612*b* is overlapped with initial transmission 622*b* of the LTE transmission block, LTE initial transmission 622*b* is transmitted (i.e., the NR RX 612*b* will be dropped, or in other words, not received and/or decoded). When the NR RX is dropped or not to be received, the corresponding radio resource may be used for the LTE initial transmission, as shown in step 608.

In some embodiments, the initial transmission of the LTE transmission block being transmitted successfully from a UE may refer to the fact that the initial transmission is successfully received by an intended recipient. Upon successful reception of the transmission, the intended recipient may send an acknowledgement (ACK) to the sender, i.e., the UE. The UE will know that the initial transmission is successful once it receives the ACK.

Here, it is also assumed that the second RAT, i.e., the LTE (through which data is transmitted (TX) by the UE), has a higher priority than the first RAT, i.e., the NR (through which data is received (RX) by the UE).

In some other embodiments, the first data transmission (i.e., NR RX) over the first RAT is received by the transceiver; the second data transmission (i.e., LTE Re-TX) over the second RAT is a retransmission from the transceiver; the processor further detects whether a corresponding initial transmission from the transceiver over the second RAT is successfully received in step 602 as shown in FIG. 6B; and the first data transmission is dropped upon detection of unsuccessful reception, and the second data transmission is dropped upon detection of successful reception.

In some other embodiments, the first data transmission (i.e., NR RX) over the first RAT is received by the transceiver; the second data transmission (i.e., LTE Re-TX) over the second RAT is a retransmission by the transceiver; the processor further determines whether initial transmission by the transceiver over the second RAT is successfully transmitted in step 602 as shown in FIG. 6B; and the first data transmission is not received upon unsuccessful initial transmission, and the second data transmission is dropped upon successful initial transmission.

Optionally, the above mechanism may further include a priority level comparison shown in step 604 of FIG. 6B. With comparison of the priority level of LTE retransmission and NR reception,
    if the priority level of LTE retransmission is higher than the priority level of NR reception, LTE retransmission is transmitted, as shown in step 606;
    else if the priority level of LTE retransmission is lower than the priority level of NR reception, LTE retransmission is dropped (i.e., to receive NR transmission) as shown in step 608.

Optionally or alternatively, the above mechanism may further include a priority level threshold. The priority level threshold can be pre-configured or configured by a base station. The base station pre-configures or configures a priority level threshold, and
    if the priority level of NR reception is higher than the configured/pre-configured priority level threshold, NR transmission is received (case 1, the initial transmission of one LTE transmission block is dropped; case 2, the retransmission of one LTE transmission block is dropped);

else if the priority level of NR reception is lower than the configured/pre-configured priority level threshold, LTE initial/retransmission is transmitted.

In some embodiments, when NR UE performs resource selection for a sidelink transmission, it should exclude the resource which is selected for initial transmission of one LTE transmission block (i.e., to avoid NR TX and LTE TX overlap) or exclude the resource which is indicated to for initial transmission of one LTE transmission block from the other UE (i.e., to avoid NR TX and LTE RX overlap).

The above collision may be avoided, minimized, or alleviated by improved scheduling of the NR data transmissions. For example, the processor may schedule a third data transmission over the first RAT (i.e., NR) excluding overlapping resources scheduled for initial transmissions over the second RAT (i.e., LTE). The third data transmission may be transmitted before or after the first data transmission. While scheduling the third data transmission, the processor may mark resources for initial transmissions over the second RAT as reserved, indicating that transmission time duration of the resources is unavailable for the third transmission block.

Optionally, when NR UE performs resource selection for a sidelink transmission, it should exclude the resource which is selected for retransmission of one LTE transmission block (i.e., to avoid NR TX and LTE TX overlap) or exclude the resource which is indicated to for retransmission of one LTE transmission block from the other UE (i.e., to avoid NR TX and LTE RX overlap).

The processor may further schedule a third data transmission over the first RAT (i.e., NR) excluding overlapping resources for retransmissions over the second RAT (i.e., LTE). The processor may perform a resource selection for a sidelink transmission over the first RAT, and the resource selection excludes resources which are selected for retransmission over the second RAT.

Optionally, this mechanism may further include a priority level comparison to compare the priority level of LTE retransmission and NR transmission/reception. The scheduling of the third data transmission may be based on comparison of its priority level (i.e., priority level of the NR sidelink transmission) and a second priority level of the second data transmission.

If the priority level of LTE transmission/retransmission is higher than the priority level of NR transmission, the resources selected for LTE transmission/retransmission may be marked as reserved, and the NR transmission will be scheduled to exclude the reserved resources, namely avoiding full or partial overlapping with the reserved resources.

Otherwise, the priority level of LTE transmission/retransmission is lower than the priority level of NR transmission, then the NR transmission may be scheduled without considering the resources selected for the LTE transmission/retransmission. In this case, collision may occur, and once it occurs, the NR data transmission will be transmitted since it has a higher priority, while the LTE transmission/retransmission will be dropped.

Figure 7:
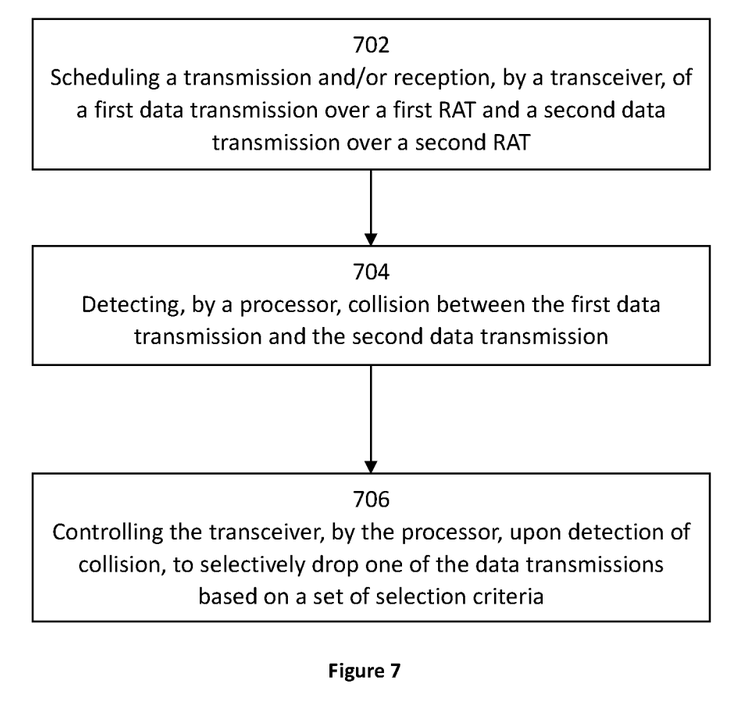
FIG. 7 is a flow diagram illustrating steps of a resolution handling in-device coexistence of NR V2X and LTE V2X sidelinks.

FIG. 7 is a flow diagram illustrating steps of a resolution handling in-device coexistence of NR V2X and LTE V2X sidelinks.

In step 702, the transceiver schedules a transmission and/or reception of a first data transmission over a first radio access technology (RAT) and a second data transmission over a second RAT.

In step 704, the processor detects collision between the first data transmission and the second data transmission.

In step 706, the processor further controls the transceiver, upon detection of collision, to selectively drop one of the data transmissions based on a set of selection criteria.

The set of selection criteria may include: priorities of the first RAT and the second RAT, and an attribute of the second data transmission indicative of whether it is an initial transmission or a retransmission.

In some embodiments, the set of selection criteria may further include comparison of a first priority level of the first data transmission and a second priority level of the second data transmission.

In some embodiments, the set of selection criteria may further include comparison of a first priority level of the first data transmission and a priority level threshold.

In some embodiments, the first data transmission may be dropped upon determining that the second data transmission is an initial transmission. The second data transmission may be dropped upon determining that the second data transmission is a retransmission.

Upon determining that the second data transmission is a retransmission, the processor may further compare a first priority level of the first data transmission and a second priority level of the second data transmission, and selectively drop one of the data transmissions with a lower priority level.

Optionally or alternatively, upon determining that the second data transmission is a retransmission, the processor may further compare a first priority level of the first data transmission and a priority level threshold, and selectively drop one of the data transmissions based on a result of the comparison.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE), comprising:
at least one memory; and
at least one processor coupled with the at least one memory and configured to cause the UE to:
transmit both of a first data transmission over a first radio access technology and a second data transmission over a second radio access technology or receive both of the first data transmission over the first radio access technology and the second data transmission over the second radio access technology; and
detect a collision between the first data transmission and the second data transmission;
compare, in response to the first radio access technology being of a different radio access technology type than the second radio access technology and in further response to an attribute of the second data transmission indicative of whether the second data transmission is an initial transmission or a retransmission indicating that the second data transmission is the retransmission, a first priority level of the first data transmission to a second priority level of the second data transmission, a priority level threshold, or some combination thereof; and upon detection of the collision, selectively drop one of the first and second data transmissions based on a set of selection criteria, the set of selection criteria comprising the attribute, wherein the second data transmission is dropped in response to the attribute indicating the retransmission and the first priority level being greater than the second priority level, the priority level threshold, or some combination thereof, and the first data transmission is dropped in response to the attribute indicating that the second data transmission comprises the initial transmission.

2. The UE of claim 1, wherein the first radio access technology is new radio, and the second radio access technology is long-term evolution.

3. The UE of claim 1, wherein the collision between the first data transmission and the second data transmission occurs where the first and the second data transmissions overlap in a time domain.

4. The UE of claim 1, wherein the priority level threshold is pre-configured and/or configured by a base station.

5. The UE of claim 1, wherein
the first data transmission over the first radio access technology is transmitted by a transceiver;
the second data transmission over the second radio access technology is a retransmission received by the transceiver;
the at least one processor is configured to cause the UE to detect whether a corresponding initial transmission over the second radio access technology is successfully received by the transceiver; and
the first data transmission is dropped upon detection of unsuccessful reception of the initial transmission, and a retransmission of the second data transmission is not received upon successful reception of the initial transmission.

6. The UE of claim 1, wherein
the first data transmission over the first radio access technology is received by a transceiver;
the second data transmission over the second radio access technology is a retransmission by the transceiver;
the at least one processor is configured to cause the UE to detect whether a corresponding initial transmission by the transceiver over the second radio access technology is successfully transmitted; and
the first data transmission is not received upon unsuccessful initial transmission, and the second data transmission is dropped upon successful initial transmission.

7. The UE of claim 1, wherein the at least one processor is configured to cause the UE to schedule a third data transmission over the first radio access technology excluding overlapping resources for initial transmissions over the second radio access technology.

8. The UE of claim 7, wherein the at least one processor is configured to cause the UE to schedule the third data transmission over the first radio access technology excluding overlapping resources for retransmissions over the second radio access technology.

9. The UE of claim 8, wherein the scheduling of the third data transmission is based on comparison of its priority level and the second priority level of the second data transmission.

10. A method performed by a user equipment (UE), the method comprising:
scheduling a transmission of both of a first data transmission over a first radio access technology and a second data transmission over a second radio access technology or a reception of both of the first data transmission over the first radio access technology and the second data transmission over the second radio access technology;
detecting a collision between the first data transmission and the second data transmission;
comparing, in response to the first radio access technology being of a different radio access technology type than the second radio access technology and in further response to an attribute of the second data transmission indicative of whether the second data transmission is an initial transmission or a retransmission indicating that the second data transmission is the retransmission, a first priority level of the first data transmission to a second priority level of the second data transmission, a priority level threshold, or some combination thereof; and
upon detection of the collision, selectively dropping one of the first and second data transmissions based on a set of selection criteria, the set of selection criteria comprising the attribute, wherein the second data transmission is dropped in response to the attribute indicating the retransmission and the first priority level being greater than the second priority level, the priority level threshold, or some combination thereof, and the first data transmission is dropped in response to the attribute indicating that the second data transmission comprises the initial transmission.

11. The method of claim 10, wherein the first radio access technology is new radio, and the second radio access technology is long-term evolution.

12. The method of claim 10, wherein the collision between the first data transmission and the second data transmission occurs where the first and the second data transmissions overlap in a time domain.

13. A processor for wireless communication, comprising:
at least one controller coupled with at least one memory and configured to cause the processor to:
transmit and/or receive both of a first data transmission over a first radio access technology and a second data transmission over a second radio access technology or receive both of the first data transmission over the first radio access technology and the second data transmission over the second radio access technology;
detect a collision between the first data transmission and the second data transmission;
compare, in response to the first radio access technology being of a different radio access technology type than the second radio access technology and in further response to an attribute of the second data transmission indicative of whether the second data transmission is an initial transmission or a retransmission indicating that the second data transmission is the retransmission, a first priority level of the first data transmission to a second priority level of the second data transmission, a priority level threshold, or some combination thereof; and
upon detection of the collision, selectively drop one of the first and second data transmissions based on a set of selection criteria, the set of selection criteria comprising the attribute, wherein the second data transmission is dropped in response to the attribute indicating the retransmission and the first priority level being greater than the second priority level, the priority level threshold, or some combination thereof, and the first data transmission is dropped in response to the attribute indicating that the second data transmission comprises the initial transmission.

* * * * *